No. 861,463. PATENTED JULY 30, 1907.
O. H. HYDE.
BALANCING EMERY WHEELS AND SIMILAR DEVICES.
APPLICATION FILED JAN. 31, 1907.
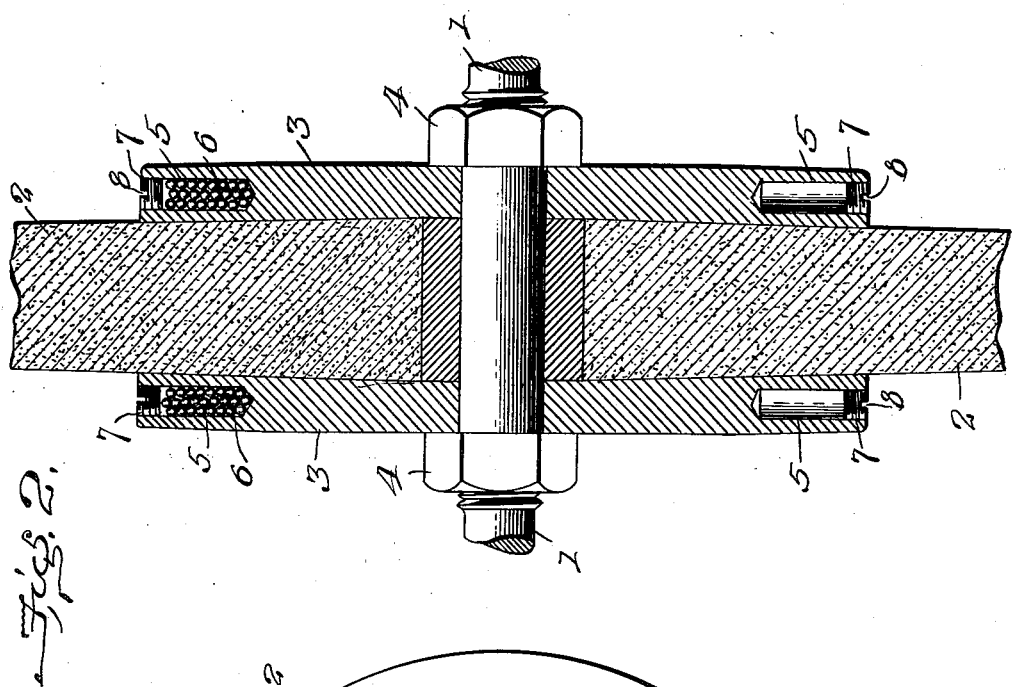
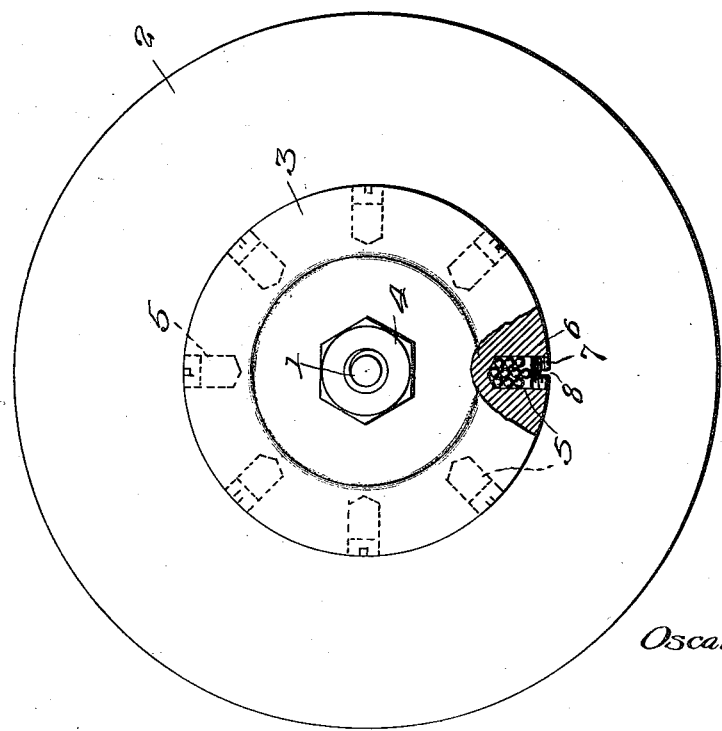
Inventor
Oscar H. Hyde,
Witnesses
By
Attorney

UNITED STATES PATENT OFFICE.

OSCAR H. HYDE, OF ST. LOUIS, MISSOURI.

BALANCING EMERY-WHEELS AND SIMILAR DEVICES.

No. 861,463.　　　　Specification of Letters Patent.　　　　Patented July 30, 1907.

Application filed January 31, 1907. Serial No. 354,980.

*To all whom it may concern:*

Be it known that I, OSCAR H. HYDE, a citizen of the United States, residing at St. Louis, in the State of Missouri, have invented certain new and useful Improvements in Balancing Emery-Wheels and Similar Devices, of which the following is a specification, reference being had therein to the accompanying drawings.

The present invention relates to improvements in balancing emery wheels and similar devices.

The object of the invention is to provide a balancing device which can be constructed together with and as a part of the ordinary clamping or safety collar, and to so construct the same that the weights can be so adjusted as to perfectly balance the emery wheel or other device to which it is applied; and further to provide such a device that can be embodied in the ordinary clamping or safety collars without materially increasing the cost of the same and without weakening the same or altering their size or general construction.

With these objects in view my invention consists in certain novel features of construction to be hereinafter described, and then more fully pointed out in the claims.

In the accompanying drawings, Figure 1 is a side elevation of an emery wheel and clamping collar embodying my invention; and Fig. 2 is a section taken centrally through Fig. 1, with the emery wheel partially broken away.

In these drawings, I have illustrated one embodiment of my invention, in which the reference numeral 1 indicates the ordinary shaft upon which the emery wheel 2 is mounted. This wheel may be of any construction, that shown being of the usual form having the central portion thick and gradually tapering towards its periphery. The clamping collars 3 are mounted on the shaft 1 on the opposite sides of the emery wheel 2 and are clamped rigidly against the same by any suitable means, that shown in the drawings being merely a pair of nuts 4 screwed up tightly against the sides of the clamping collars. These clamping collars are usually what are known as safety collars, being of a considerable diameter relatively to the emery wheel and having their inner faces concave to correspond to the convex surface of the wheel, so that the same will be held firmly between the two clamping collars. These collars are provided around their periphery with a series of recesses 5, which are preferably arranged radially thereof and are adapted to receive a quantity of loose material 6, such as shot, which is a convenient form of weight. The outer ends of the recesses 5 are screw-threaded and adapted to receive a screw-threaded plug 7 which extends into the same so that its outer end is substantially flush with the periphery of the collar. The outer end of the plug is provided with a suitable socket 8, adapted to receive a screw-driver or other tool for inserting and removing the plug. The number of recesses employed may be varied according to the size of the wheel and according to other conditions which may exist under different circumstances. In the present case, the wheel is of ordinary size and I prefer to employ eight of the recesses, this bringing the recesses sufficiently close together to allow the weight to be adjusted so as to perfectly balance the wheel. The size of the recess may also be varied according to the size of the wheel and the collar employed, but, with a wheel of ordinary size, I prefer to form the recesses from an inch to an inch and a half in depth and from a quarter to three-eighths of an inch in diameter. This provides a recess of sufficient size to receive an amount of shot or other heavy material to balance any ordinary wheel.

The manner in which the wheels are balanced will be obvious from the foregoing description. In brief it is as follows: The collars 3 and the wheel 2 are mounted upon the shaft 1, which is loosely mounted and free to turn in its bearings. If there is any inequality in the wheel, the heavy side thereof will immediately move towards the bottom. By a proper adjustment of weight in the recesses 5 which are brought uppermost, this inequality of weight can be overcome and the wheel balanced perfectly on its axis.. This construction of the balance device enables me also to use a loose material, such as shot which can be readily inserted and as readily removed when the collars are applied to a different wheel and it is desired to place the weight in the collars at a different point.

I have shown and described the device as embodied in an ordinary concave safety collar, but it will be obvious that the same could be applied to a collar of almost any construction, and further that the invention can be readily applied to other devices than emery wheels, such, for instance, as polishing wheels or any device comprising a rotary member which requires to be balanced.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a device of the character described, the combination, with a rotary member having a plurality of recesses formed in the periphery thereof and adapted to receive a weight, substantially as described.

2. A device of the character described, comprising a rotary member having a plurality of radially extending recesses formed in the periphery thereof and adapted to receive a weight, substantially as described.

3. A device of the character described, comprising a rotary member having a plurality of radially extending recesses formed in the periphery thereof, and means for closing said recesses, substantially as described.

4. A device of the character described comprising a rotary member having a plurality of recesses formed in the periphery thereof and having their outer ends screw threaded, and a screw-threaded plug adapted to engage said screw-threaded end of said recesses, substantially as described.

5. A device of the character described comprising a rotary member having a plurality of recesses formed in the periphery thereof, a closure for said recess adapted to extend within the same and to have its outer end flush with the periphery of said rotary member, substantially as described.

6. A device of the character described comprising an emery wheel, clamping collars arranged on the opposite sides thereof, a plurality of recesses formed in the peripheries of said collars and adapted to receive a weight, and means for closing said recesses, substantially as described.

In testimony whereof, I affix my signature in presence of two witnesses.

OSCAR H. HYDE.

Witnesses:
W. O. ROPER,
CHAS. W. HAM.